(12) United States Patent
Boyer et al.

(10) Patent No.: US 11,407,187 B2
(45) Date of Patent: Aug. 9, 2022

(54) CONTINUOUS CHANNEL RESIN TRANSFER MOLDING WITH RAPID CYCLE TIME

(71) Applicant: Continental Structural Plastics, Inc., Auburn Hills, MI (US)

(72) Inventors: Dominique Boyer, Pouance (FR); Philippe Bonte, Pouance (FR); Marc-Philippe Toitgans, Pouance (FR)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 115 days.

(21) Appl. No.: 16/472,740

(22) PCT Filed: Dec. 20, 2017

(86) PCT No.: PCT/US2017/067555
§ 371 (c)(1),
(2) Date: Jun. 21, 2019

(87) PCT Pub. No.: WO2018/125711
PCT Pub. Date: Jul. 5, 2018

(65) Prior Publication Data
US 2019/0315079 A1 Oct. 17, 2019

Related U.S. Application Data

(60) Provisional application No. 62/439,323, filed on Dec. 27, 2016.

(51) Int. Cl.
*B29C 70/48* (2006.01)
*B29C 70/54* (2006.01)
*B29C 70/44* (2006.01)

(52) U.S. Cl.
CPC ............ *B29C 70/48* (2013.01); *B29C 70/443* (2013.01); *B29C 70/546* (2013.01)

(58) Field of Classification Search
CPC .............................. B29C 70/546; B29C 70/40
See application file for complete search history.

(56) References Cited

U.S. PATENT DOCUMENTS 4,740,346 A * 4/1988 Freeman ............... B29C 70/865
264/258
6,063,315 A * 5/2000 Keller ................. B29C 45/1704
264/40.1

(Continued)

FOREIGN PATENT DOCUMENTS

DE 29720598 U1 * 2/1998
DE 102014007869 A1 12/2015

(Continued)

OTHER PUBLICATIONS

Supplementary European Search Report issued in EP17889201, dated Jun. 23, 2020.

(Continued)

*Primary Examiner* — Niki Bakhtiari
*Assistant Examiner* — Emmanuel S Luk
(74) *Attorney, Agent, or Firm* — Blue Filament Law PLLC

(57) ABSTRACT

A process for resin transfer molding (RTM) with injection and overflowing of a resin through one or more troughs is provided that includes the injection of resin into a plurality of injection ports feeding the one or more troughs and overflowing the resin in into a mold. The temperature and pressure are controlled as applied to the mold. The injection ports are activated for injecting the resin in any order of individually, in groups, or pairings. A resin transfer molding (RTM) system for performing the process includes a mold having a cavity. A set of injection ports feed one or more continuous channels between the cavity and a reservoir of resin. A numerical controller selectively activates the injec- (Continued)

tion ports to overflow the resin into the cavity in any order of individually, in groups, or pairing.

11 Claims, 4 Drawing Sheets

(56) References Cited

U.S. PATENT DOCUMENTS

| | | | |
|---|---|---|---|
| 9,616,622 B2* | 4/2017 | Yamamoto | ........ B29C 45/14786 |
| 9,950,479 B2* | 4/2018 | Yamamoto | .......... B29C 45/0005 |
| 2003/0122285 A1 | 7/2003 | Crane et al. | |
| 2003/0209841 A1 | 11/2003 | Porter | |
| 2004/0247834 A1 | 12/2004 | Ludwig et al. | |
| 2007/0182071 A1 | 8/2007 | Sekido et al. | |
| 2010/0093911 A1* | 4/2010 | Guha | ...................... C08L 51/08 |
| | | | 524/433 |
| 2011/0272853 A1* | 11/2011 | Tsuji | ...................... B29C 70/48 |
| | | | 264/257 |
| 2013/0093126 A1* | 4/2013 | Masini | ................... B29C 33/20 |
| | | | 264/570 |
| 2016/0289430 A1* | 10/2016 | Van Der Waal | ........ B29C 45/18 |
| 2018/0154987 A1* | 6/2018 | Huff, Jr | .............. B29C 45/1704 |

FOREIGN PATENT DOCUMENTS

| | | | |
|---|---|---|---|
| EP | 1555104 | A1 | 7/2005 |
| EP | 1721719 | A1 | 11/2006 |
| EP | 2322713 | A1 * | 5/2011 |
| JP | 2011168010 | A * | 9/2011 |
| WO | 2015084933 | A1 | 6/2015 |
| WO | WO2015084933 | A1 * | 6/2015 |

OTHER PUBLICATIONS

Int'l Search Report issued in PCT/US2017/067555, dated Apr. 16, 2018.

* cited by examiner

CONTINUOUS CHANNEL RESIN TRANSFER MOLDING WITH RAPID CYCLE TIME

RELATED APPLICATIONS

This application claims priority benefit of U.S. Provisional Application Ser. No. 62/439,323 filed 27 Dec. 2016; the contents of which are hereby incorporated by reference.

FIELD OF THE INVENTION

The present invention in general relates to resin transfer molding and in particular to an improved resin transfer molding process with a continuous channel injection of resin by time and position in a multisided injection system.

BACKGROUND OF THE INVENTION

Resin transfer molding (RTM) is a method of fabricating composite structures with high strength, complex geometries, tight dimensional tolerances, and part quality typically required for automotive and aerospace applications. RTM uses a closed mold commonly made of aluminum with a fiber "lay-up" such as graphite placed into the mold. The mold is closed, sealed, heated, and placed under vacuum. A room temperature (20° C.) or heated resin is then injected into the mold to impregnate the fiber layup. Having the mold heated and under vacuum assists the resin flow. The mold is then held at a temperature sufficient to cure the resin. Typically, a resin experiences three distinct states during the RTM process; a viscous state during injection, a gelling state during which the viscosity of the resin changes to a higher viscosity, and a cure time when the resin materials chemically crosslink and the resin hardens. Molds used for RTM have one or more injection ports for introducing the resin, and at least one exhaust port for gas and excess resin to leave the mold. Multiport injection molds are typically used for larger parts that have an increased processing time.

A common problem encountered during the RTM process is a non-uniform flow of the resin, where the resin experiences a change in viscosity as the resin travels away from the injection point. Furthermore, as shown in the graph of FIG. 1 as the time of processing progresses the pressure and temperature experienced by the resin decreases as a function of time. The aforementioned problems experienced during the RTM process contribute to defects in formed parts.

Thus, there exists a need for an improved RTM injection process that minimizes both production defects and cycle time.

SUMMARY OF THE INVENTION

A process for resin transfer molding (RTM) with injection and overflowing of a resin through one or more troughs is provided that includes the injection of resin into a plurality of injection ports feeding the one or more troughs and overflowing the resin into a mold. The temperature and pressure are controlled as applied to the mold. The injection ports are activated for injecting the resin in any order of individually, in groups, or pairings.

A resin transfer molding (RTM) system for performing the process includes a a mold having a cavity. A set of injection ports are each in fluid communication and feeding one or more continuous channels between the cavity and a reservoir of resin. A numerical controller selectively activates the injection ports for injecting resin from the reservoir and filling troughs in the one or more channels so as to overflow the resin into the cavity in any order of individually, in groups, or pairing.

DETAILED DESCRIPTION OF THE INVENTION

Figure 1:
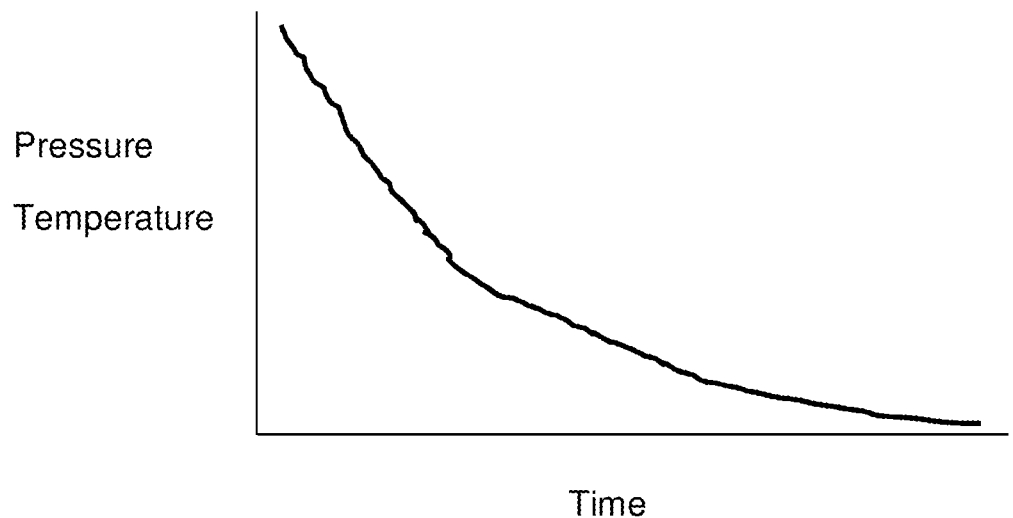
FIG. 1 is a graph showing the typical response curve as the time of processing progresses the pressure and temperature experienced by the resin decreases as a function of time.

The present invention has utility as an improved resin transfer molding (RTM) process with an injection of resin via a continuous trough by time and position in a multipoint injection system. The rapid introduction of resin provides a quick fill of a mold by overflowing the one or more continuous channels into the mold. The injection of resin via a continuous trough achieves an improved pressure and temperature profile versus time for the resin used for forming parts versus existing RTM processes that simultaneously inject resin via a series of narrow injection ports. The series of injection ports are activated for injecting said resin in any order of individually, in groups, or pairings. The rapid introduction of resin via one or more continuous channels across a fiber "lay-up" positioned in a mold in embodiments of the inventive process provide for improved product yields with fewer formed part defects resulting from non-impregnated portions, thereby improving the quality of the molded product. Furthermore, product cycle time is also reduced by the rapid introduction of the injection of resin via the channels of the multiport mold versus the existing process of simultaneous injection of resin in a multiport mold. It has been observed that cycle time for forming parts has been reduced from approximately 10-60 minutes to total molding times of less than two minutes at a lower pressure (>100 bars move fibers in the mold cavity) with the inventive process of the injection of resin through channels in a multiport mold.

Embodiments of the inventive RTM system may be configured with three channels positioned on three of the perimeter sides of a mold with a fourth side connected to a vacuum source. In a specific inventive embodiment opposing sides of the mold may be configured with resin fill channels with a vacuum port positioned in the middle between the opposing channels. In a specific inventive embodiment, a single overflow channel into a mold is provided for laminar flow. In some inventive embodiments, the resin flow is triggered such that opposing ports are triggered to offset flow of resin associated with each. As a result, the resin flows from opposing ports once the streams of resin come into contact there is limited additional flow and as a result the preferential orientation of fiber filler is limited. In the instance, where there are ports opposite the vacuum, these vacuum opposing ports are opened to flow resin at a time removed from the ports that oppose one another, with the flow from the vacuum opposing ports only assuring mold fill, yet with limited travel of resin in the mold to also limit fiber filler orientation in the direction of resin flow.

Resins used in embodiments of the inventive RTM process include thermosetting resins such as epoxy; urethanes; polyesters, and vinylesters; that are low in viscosity and easy to be impregnated into reinforcing fibers. These resins illustratively include epoxy resin, an unsaturated polyester resin, a polyvinylester resin, a phenolic resin, a guanamine resin, a polyimide resin such as bismaleimide triazine resin, a furan resin, a polyurethane resin, a polydiarylphthalate resin, a melamine resin, a urea resin, an amino resin, etc. Fibers may be introduced to the resin used in certain embodiments of the inventive channel resin feed RTM process to strengthen formed parts including glass, carbon, and other synthetic fibers, as well as natural fibers. Natural fibers may include coconut fibers, bamboo fibers, sugar cane fibers, banana skin fibers, etc.

Figure 2:
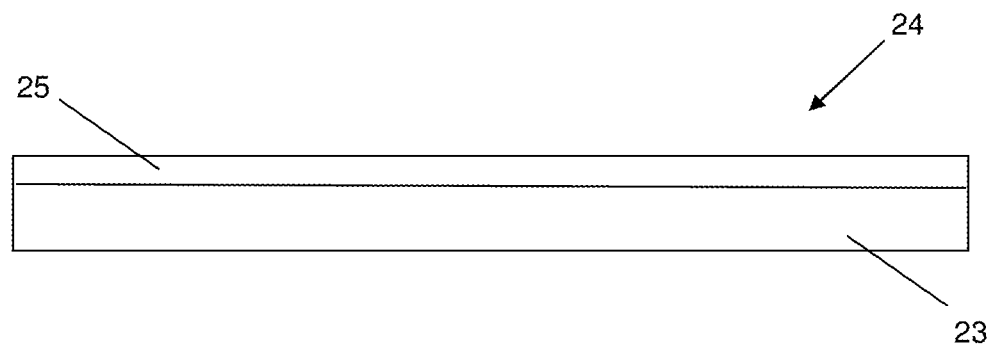
FIG. 2 is a side view of a continuous channel in accordance with an embodiment of the invention.

FIG. 2 is a side view of a continuous channel 24 in accordance with an embodiment of the invention. The continuous channel 24 may have a trough 23 and an overflow slot or opening 25 that supplies the molten resin to the mold.

Figure 3:
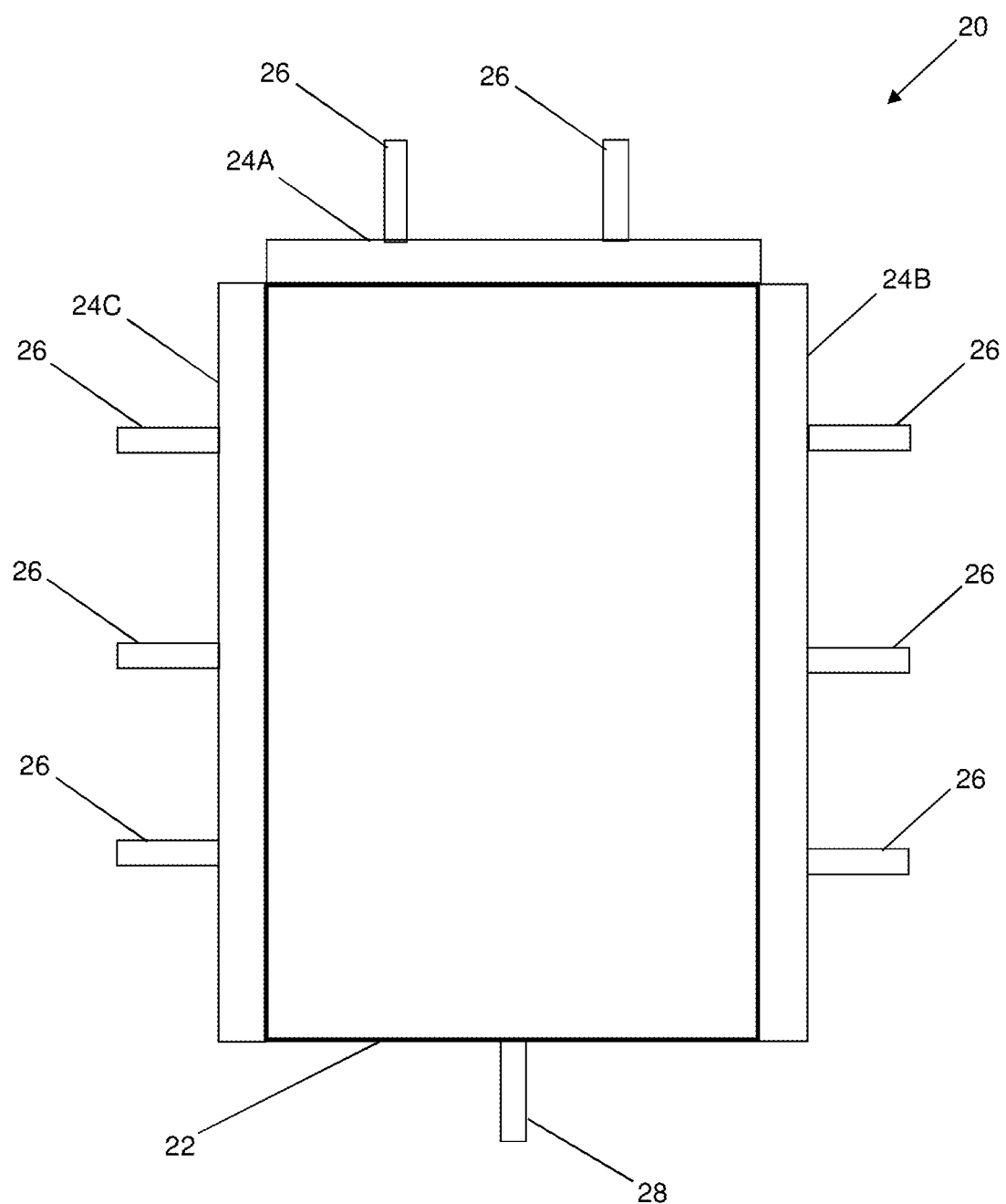
FIG. 3 is a view of a multiport channel fed RTM mold with one to three channels available to supply injected resin to a mold according to embodiments of the invention.

FIG. 3 is a view of a multiport channel fed RTM system 20 configured with one, two, or three channels (24A, 24B, 24C) available to supply injected resin to a mold 22 according to embodiments of the invention. The channels (24A, 24B, 24C) are supplied with resin via injection ports 26. It is noted that the number of injection ports 26 may vary from the embodiment shown, without changing the basic operation of the continuous channels (24A, 24B, 24C). In operation the multiple injection ports 26 feed molten resin into trough 23 and as the trough 23 fills up, overflowing resin from the trough 23 exits the channel(s) (24A, 24B, 24C) via the overflow slot 25 as shown in FIG. 2. Vacuum or negative pressure is supplied to the mold 22 through vacuum port 28. In a specific inventive embodiment opposing sides of the mold may be configured with resin fill channels (24B, 24C) with a vacuum port 28 positioned in the middle between the opposing channels (24B, 24C). In a specific inventive embodiment, a single overflow channel 24A into the mold 22 is provided for laminar flow.

In embodiments of the inventive multiport channel fed RTM system and process; the firing or activation order and patterns of usage of the resin injectors are preprogrammed into a numerical controller or computing device with a processor and a storage medium for storing and executing the programs. In an embodiment of the inventive multiport channel fed RTM system, the numerical controller may also control a carousal with multiple injection mold fixtures that can be automatically loaded into position for the multiport channel fed injection process, and then removed and another mold fixture can be moved into position while a formed part is removed from the first fixture.

Figure 4:
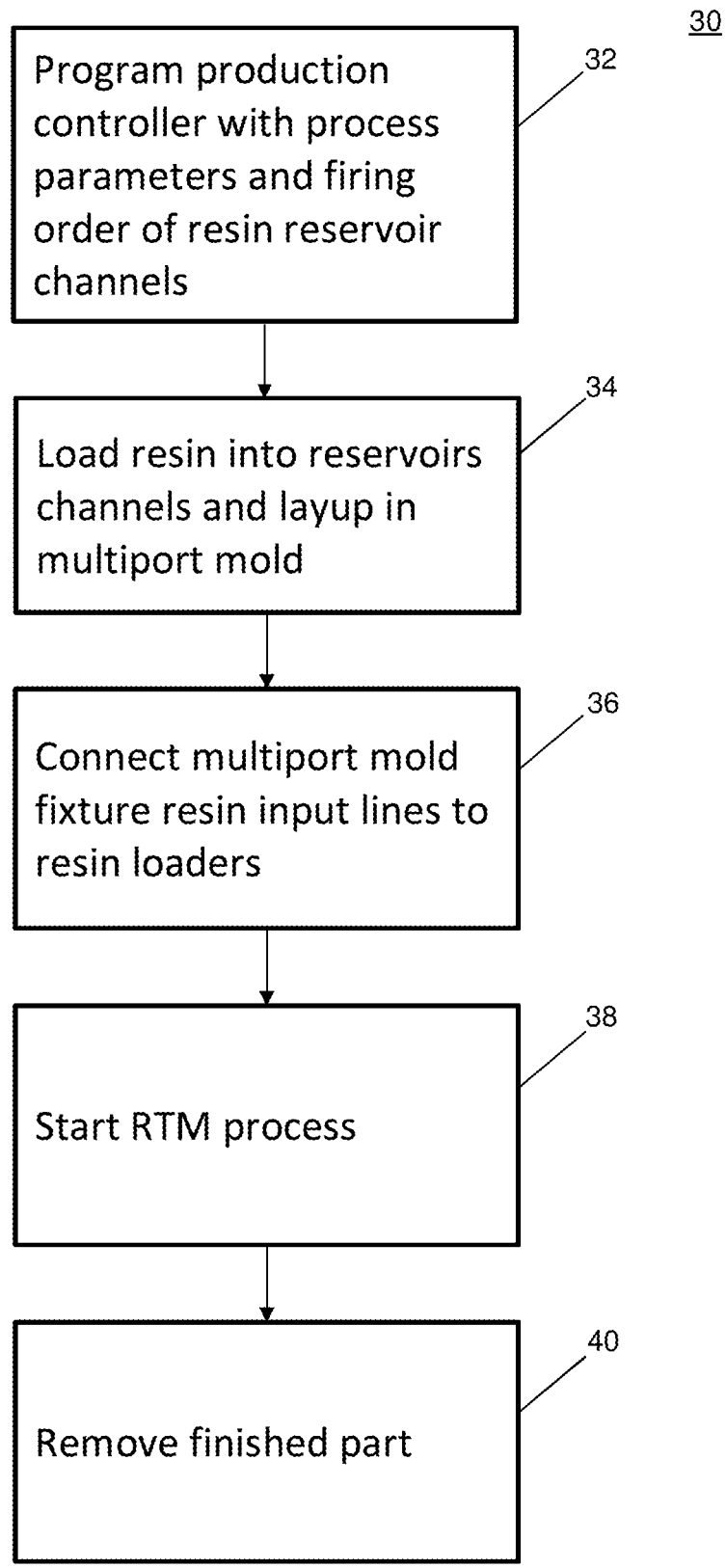
FIG. 4 is a flowchart of a production process of the channel based multiport channel fed RTM process according to embodiments of the invention.

FIG. 4 is a flowchart of a production process 30 of the multiport channel fed RTM process according to embodiments of the invention. The process starts with an operator programming a production controller (step 32) with process parameters for a particular molded part to be formed with the RTM process using a multi resin injection port mold with overflow channels. Process parameters including pressure, temperature, flow rate, and firing sequence of the resin injectors are set by the operator based on the resin material and part to be formed in the RTM process. The operator loads the resin for forming the part into the reservoirs of the resin injectors, as well as the layup into the mold (step 34). The multiport channel fed mold fixture resin input lines are hooked up to the resin injectors (step 36). The RTM process is started (step 38), and the completed part is removed from the mold (step 40).

EXAMPLES

Example 1

An RTM process using one or more of the inventive channels to supply resin into a mold is carried out with the following material and process parameters:

Resin material with a resin viscosity boundary of 30 mPa sec at an injection temperature of 70° C. with a fiber content boundary of 40% by volume is introduced into a mold at a flow rate of injection of 1 to 10 liters per minute;

Pressure of injection is at less than 100 bars, and in a specific embodiment at 80 bars, where the limiting factor is equipment safety capability;

Voiding of the injected resin in terms permeability is measured at $10^{-11}$ to $10^{-12}$ m$^2$ The mold tool is maintained at 120° C.;

In order control or eliminate fiber displacement of the injected resin material a binder is included illustratively including epoxy powder, a PET based fiber, or a solvent. The binder content is 4% of fiber by weight. Vacuum is applied to the mold in a sequence after an outer seal is engaged, where in a press configuration the outer seal engages at 0.6 mm from full closure of the press for a duration of 2 seconds.

OTHER EMBODIMENTS

Figure 5:
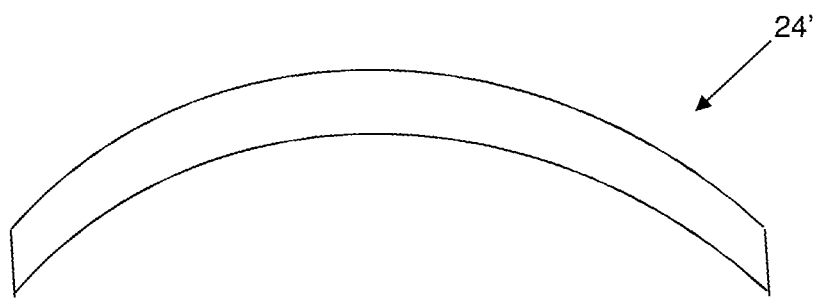
FIG. 5 is a top perspective view of a curved or arced resin feed channel according to an embodiment of the invention.
Figure 6:
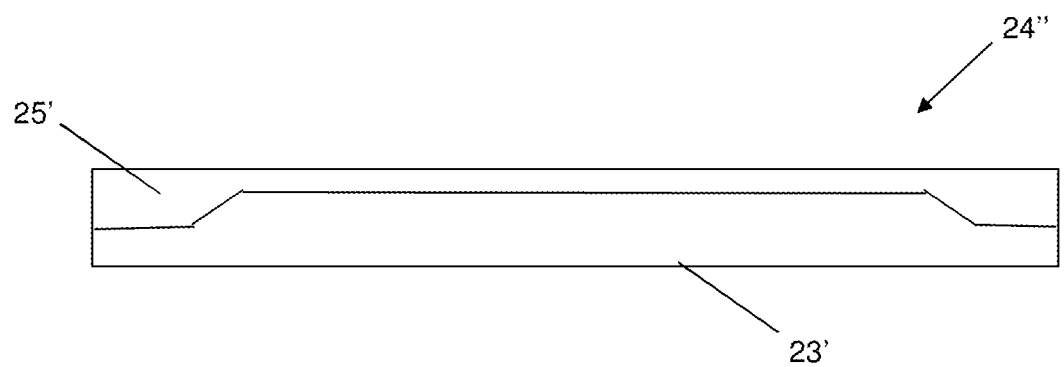
FIG. 6 is a side perspective view of a resin feed channel with a variable height threshold overflow slot or opening in accordance with embodiments of the invention.

The overflow channels 24 may have a bowed or arc shape for oval or circular molds, or to introduce overflow resin materials at differing times along the length or various portions of the channels. FIG. 5 is a top perspective view of a curved or arced resin feed channel 24' according to an embodiment of the invention. FIG. 6 is a side perspective view of a resin feed channel 24'' with a variable height threshold overflow slot or opening 25' in accordance with embodiments of the invention.

The foregoing description is illustrative of particular embodiments of the invention, but is not meant to be a limitation upon the practice thereof. The following claims, including all equivalents thereof, are intended to define the scope of the invention.

The invention claimed is:

1. A process for resin transfer molding (RTM) with injection and overflowing of a resin through one or more troughs, the process comprising:
   injecting said resin into a plurality of injection ports that collectively feed one of said one or more troughs and overflowing said resin into a mold from said one or more troughs at a flow rate of injection of 1 to 10 liters per minute and a pressure of injection between 80 and 100 bars; and
   controlling temperature and pressure applied to said mold;
   wherein said plurality of injection ports are activated for injecting said resin in any order of individually, in groups, or pairings; and
   wherein said resin is at least one of an epoxy resin, an unsaturated polyester resin, a polyvinylester resin, a phenolic resin, a guanamine resin, a polyimide resin, a bismaleimide triazine resin, a furan resin, a polyurethane resin, a polydiarylphthalate resin, a melamine resin, a urea resin, or an amino resin.

2. The process of claim 1, wherein said resin further comprises fibers that are injected into said mold with said resin.

3. The process of claim 2, wherein said fibers are at least one of glass, carbon, or other synthetic fibers.

4. The process of claim 2, wherein said fibers are natural fibers.

5. The process of claim 4, wherein said natural fibers are at least one of coconut fibers, bamboo fibers, sugar cane fibers, or banana skin fibers.

6. The process of claim 1, wherein said plurality of injection ports are activated for injecting resin in a sequential clockwise or counter clockwise order.

7. The process of claim 1, wherein said plurality of injection ports are activated based on a computer program.

8. The process of claim 1, wherein said plurality of injection ports are from 2 to 6 injection ports.

9. The process of claim 1, wherein said plurality of injection ports are 3 injection ports.

10. The process of claim 1, further comprising repeating the steps of the injecting and the controlling with a cycle time of 1 to 5 minutes.

11. The process of claim 1, wherein the controlling limits a decline of pressure and temperature during formation of a molded part in said mold.

\* \* \* \* \*